(12) United States Patent
Shukla et al.

(10) Patent No.: US 9,836,462 B2
(45) Date of Patent: Dec. 5, 2017

(54) EXTENSIBILITY MODEL FOR DOCUMENT-ORIENTED STORAGE SERVICES

(71) Applicant: Microsoft Corporation, Redmond, WA (US)

(72) Inventors: Dharma Shukla, Bellevue, WA (US); Madhan Gajendran, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 683 days.

(21) Appl. No.: 13/827,493

(22) Filed: Mar. 14, 2013

(65) Prior Publication Data
US 2014/0279825 A1    Sep. 18, 2014

(51) Int. Cl.
*G06F 17/30*    (2006.01)

(52) U.S. Cl.
CPC .............................. *G06F 17/30011* (2013.01)

(58) Field of Classification Search
None
See application file for complete search history.

(56) References Cited

U.S. PATENT DOCUMENTS

| | | | |
|---|---|---|---|
| 6,523,032 B1 * | 2/2003 | Sunkara | G06F 17/30445 |
| 6,807,636 B2 * | 10/2004 | Hartman | H04L 63/20 |
| | | | 713/153 |
| 7,305,431 B2 | 12/2007 | Karnik | |
| 7,899,892 B2 | 3/2011 | Tremblay | |
| 8,156,205 B1 | 4/2012 | Forsberg | |
| 8,171,125 B2 | 5/2012 | Gopalakrishnan | |
| 8,370,495 B2 | 2/2013 | Jackson | |
| 2007/0106843 A1 * | 5/2007 | Mori | G06F 1/3215 |
| | | | 711/114 |
| 2008/0177648 A1 * | 7/2008 | Doyle | G06Q 40/00 |
| | | | 705/35 |
| 2009/0019535 A1 | 1/2009 | Mishra | |
| 2009/0077097 A1 * | 3/2009 | Lacapra | G06F 17/302 |
| 2010/0017366 A1 * | 1/2010 | Robertson | G06F 17/30867 |
| 2010/0287019 A1 | 11/2010 | Guo | |
| 2010/0318657 A1 | 12/2010 | Charlson | |

(Continued)

*Primary Examiner* — Son T Hoang
(74) *Attorney, Agent, or Firm* — Cooper Legal Group, LLC

(57) ABSTRACT

A document service may be provided by many document service packages, each presenting a particular set of service characteristics (e.g., the performance achievable on various storage device types; the available indexing models; and the types of transactions, scripts, and queries supported by the document service). For a particular project, an administrator may endeavor to select a document service package exhibiting characteristics that match some criteria of the project and to configure or adapt the document service for other criteria, but the range of adaptability for each document service package may be limited. Presented herein are architectures for document services involving a composable set of components respectively providing a service feature with a service characteristic. The document service may be automatically composed by, for each service feature of the document service, selecting a service component for the service feature that matches the service criteria specified in a service level agreement.

20 Claims, 7 Drawing Sheets

(56) References Cited

U.S. PATENT DOCUMENTS

| | | | |
|---|---|---|---|
| 2012/0072656 A1* | 3/2012 | Archak | G06F 17/30132 711/104 |
| 2012/0192063 A1* | 7/2012 | Koren | G06F 17/30905 715/252 |
| 2012/0203800 A1 | 8/2012 | Wu | |
| 2012/0278622 A1 | 11/2012 | Lesavich | |
| 2013/0151804 A1* | 6/2013 | Alatorre | G06F 17/30165 711/170 |

* cited by examiner

EXTENSIBILITY MODEL FOR DOCUMENT-ORIENTED STORAGE SERVICES

BACKGROUND

Within the field of computing, many scenarios involve a configuration of one or more servers as a document service providing access to a set of documents representing various units of data, such as objects in an object-oriented computing environments or records of a database. Such document services may involve a variety of service characteristics, such as the indexing and querying models of the service; the scripting engine(s) available through the service; and the organization of files in the file system of the device representing the documents, indices, scripts, and metadata of the document service. In some scenarios, the set of service characteristics may affect such properties of the document service as performance, availability, usability, scalability, and reliability. Moreover, various document service packages or platforms may each exhibit different service characteristics. For example, a first document service package, designed for enterprise-level deployments, may exhibit robust transactional capabilities that guarantee atomic, consistent, isolated, and durable ("ACID") transactions; scripting engines for scripts specified in enterprise-level development languages; and storage techniques that provide high storage throughput on the types of storage devices that are often provided in enterprise-level deployments. Conversely, a second document service package, designed for small-scale projects with local deployment on commodity devices, may exhibit simplified and relaxed transactional capabilities, such as "basically" available, soft state, and "eventual" consistency ("BASE") transactions; scripting engines for scripts specified in casual development languages; and storage techniques that are adapted for commodity storage devices. Other document service packages may be suited to other types of service environments and tasks, and may include specialized technologies for particular types of tasks (e.g., document services that are adapted for extensive text processing may include robust natural-language parsing capabilities).

In order to provide a document service with a satisfactory set of service characteristics, an administrator of the server may compare the expected service criteria of the project involving the document service with the service features of respective packages. For example, the administrator may consider the power and types of hardware allocated for the document service; the types of documents to be stored therein; and the types of tasks to be performed involving the document service. The developer may then select and deploy a document service package that satisfies the criteria of the project. Additionally, the developer may research or develop configuration options for the selected document service package, such as options specified in a configuration manifest for the document service package, or variants, add-ons, or other modifications of the established framework of the document service. In this manner, an administrator may adapt the service features of the document service to the criteria of the project.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The configuration of a document service through a selection among the available set of document service packages, and the configuration thereof by an administrator, may present several disadvantages. As a first example, assessing the criteria of a project and comparing these criteria with the service features presented by various document service packages may be a complicated and lengthy process that involves extensive analysis by one or more administrators. As a second example, conventional architectures of document service packages may present a small range of configurable options, but may present other features that are inflexible or difficult to adapt for a different type of project or circumstance. As a third example, it may be difficult to adapt a document service package to include a newly devised technology or to support a particular type of project; e.g., a document service package may be suitable for a range of typical uses and tasks, but extending the document service package for new uses and tasks may be limited by the current architecture of the document service package. As a fourth example, it may be difficult to compare the projected services features with those provided in a particular scenario, or to reconfigure a deployed document service package, e.g., in response to changes in the focus or circumstances of a project supported by the document service package.

Presented herein are techniques for providing a document service that is adaptable to a wide range of scenarios. Rather than tasking an administrator of the document service with selecting and choosing a document service that is suitable for a particular project, a document service may be provided that is composable from a series of service providing each service feature of the document service. For example, the document service may be devised as a combination of a service features or interfaces, such as a file system interface; an indexing interface; a transaction interface; and a replication interface. For each interface, the document service may include a range of candidate components that are suitable for providing the service feature with a particular set of characteristics. For example, for the file system interface, the document service may include a first component satisfying the storage of the documents on a platter-based storage device; a second component satisfying the storage of the documents on a solid-state storage device; a third component satisfying the storage of the documents on a sequential-access storage device, such as magnetic tape; and a network storage device, such as a network server accessible through a network protocol. In addition, the scenario in which the document service is provided (such as a particular project) may be represented as a service level agreement specifying a set of service criteria, such as the performance and throughput to be achieved by the document service; the availability and reliability of the document service; and support by the document service for particular types of transactions, queries, and scripts. The composition of the document service from among the available set of components may therefore be automated by comparing each service criterion with the service characteristics exhibited by each candidate component for the service feature. An automated selection among the candidate components may therefore result in a suitably configured document service that satisfies the service criteria of the service level agreement.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
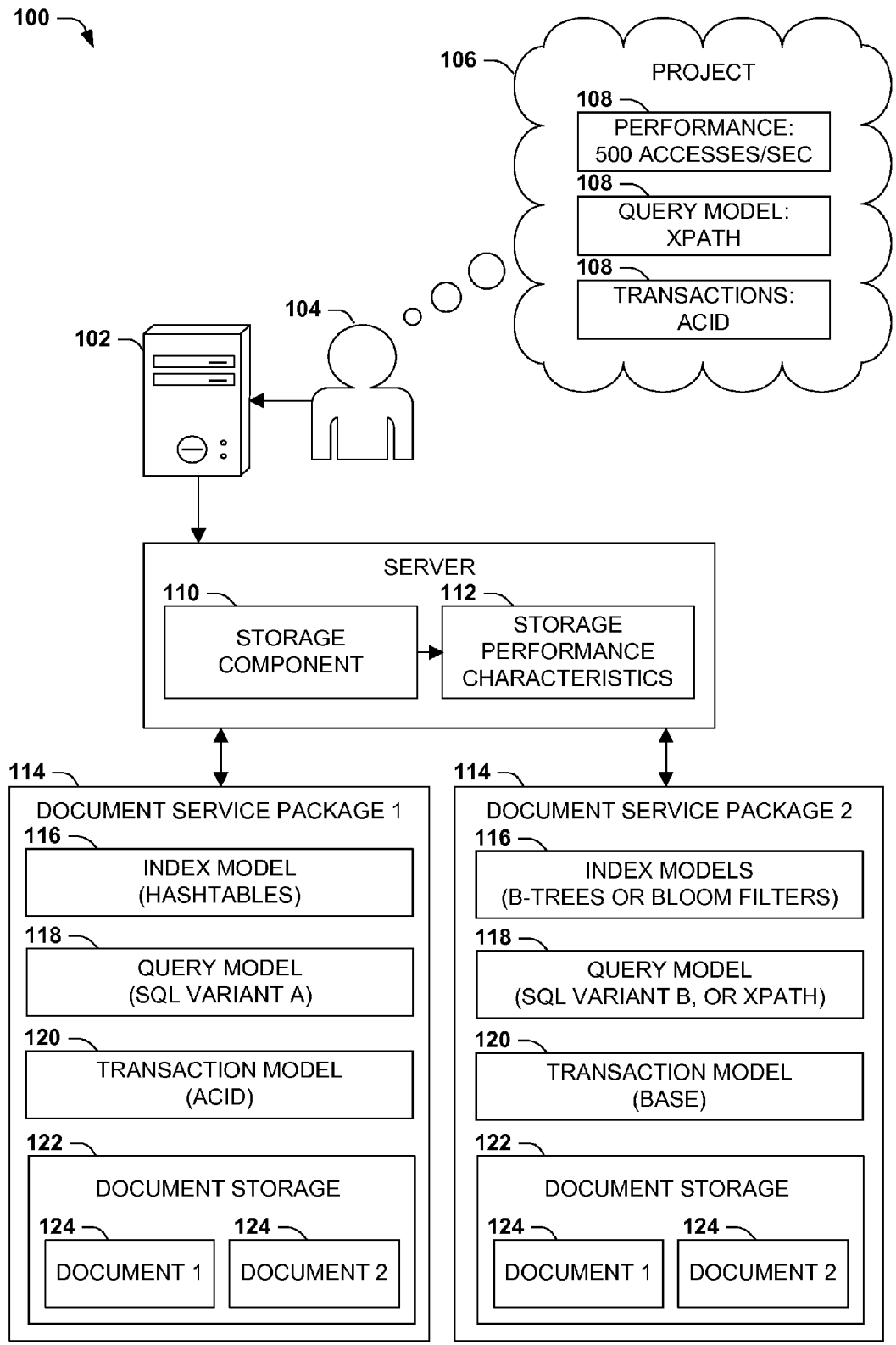
FIG. 1 is an illustration of an exemplary scenario featuring an administrative selection among a set of document service packages to create a document service for a project.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the configuration of one or more servers to provide a document service. The documents may comprise, e.g., structured objects in an object-oriented environment; records in a database system; and structured records of information generated in various languages, such as a variant of the Extensible Markup Language (XML) or the JavaScript Object Notation (JSON). In such scenarios, an administrator may seek to deploy a document service to store and provide access to documents for a project. Typically, the developer may identify the criteria of the project (e.g., the types of documents to be stored, the types of tasks to be applied to the stored documents, the access patterns of the documents, and the computing resources available to implement the document service), and may evaluate the capabilities of respective document service packages.

Typically, each document service package is developed for a particular body of users and/or a particular environment, and may provide a set of capabilities that are suitable for such scenarios. As a first example, a first document service package may be targeted for an enterprise environment, and so may provide a set of capabilities that are typically utilized in enterprise-oriented document services, such as a cluster of servers providing redundancy for failover and high availability; a storage model involving a distribution of the document set over a large set of storage devices; a transaction model enabling atomic, consistent, and durable ("ACID") transactions to the documents of the document service; and a robust indexing model that provides rapid access to a broad set of resources. As a second example, a second document service package may provide a lightweight document service for a casual deployment model, and so may be configured to execute on a variety of consumer-level devices, such as workstations and mobile phones; a basic storage model providing simple storage on commodity storage hardware; a simple transaction model that enables "basically available," simple state, and "eventually" consistent ("BASE") transactions; and a lightweight indexing model that enables the retrieval of documents matching a specified identifier. However, it may be appreciated that a document service package that is adapted to a first scenario may be poorly adapted for a second scenario. For example, an enterprise-level document service package may be difficult to deploy within a wide variety of casual computing environments; may exhibit poor performance due to the inadequate availability of computing resources, such as processing power and memory; and may present complicated models for transaction, indexing, querying, and replication that are difficult for casual developers to understand, and that consume resources to provide service features that are not utilized in the casual deployment. Conversely, the lightweight document service package may underutilize the robust resources of an enterprise deployment; may present indexing and querying models that are inadequate for the tasks to be applied within the document service; and may poorly scale to an interoperating set of servers tasked with handling a large number of concurrent requests. Therefore, among the available document service packages, an administrator may carefully consider the projected suitability of each document service package to the criteria of the project or environment in which the document service is to be employed.

FIG. 1 presents an illustration of an exemplary scenario 100 wherein a server 102 provided by an administrator 104 is configured to provide a document service supporting a particular project 106, such as a media store to be accessed by a population of users, or an application consuming the documents of the document store. The administrator 104 may have an understanding of the project 106 and a set of project criteria 108, such as a target level of performance (e.g., a number of documents accessed per second); a particular query model that is suitable for the types of queries that the administrator 104 anticipates to be applied to the document service; and a transactional model that enables particular types of transactions to be applied to the document service. The server 102 may comprise a set of hardware resources, such as a storage component 110 (e.g., a hard disk drive, a solid-state storage device, a sequential access storage device such as a magnetic tape, or a network adapter in communication with a remote storage device over a network). The storage component 110 may exhibit a set of storage performance characteristics 112, such as storage capacity; "mean time between failure" (MTBF) indicators of reliability; average read, write, and seek times; and replication models, such as redundant storage with verifiable checksums.

In order to configure the server 102 to provide the document service, the administrator 104 may evaluate a set of document service packages 114, each of which may define a set of service features 116 that are achievable by the document service package 114. For example, in addition to providing document storage 122 for a set of documents 124, a first document service package 114 may feature an indexing model 116 based on hashtables; a query model 118 based on a first variant of the Structured Query Language (SQL); and a transaction model 120 providing atomic, consistent, isolated, and durable ("ACID") transactions. A second document service package 114 may provide an index model 116 based on B-Tree data structures; a query model 118 based on a second variant of the Structured Query Language; and a transaction model 120 providing "basically" available, soft-state, and "eventually" consistent transactions. These document service packages 114 may therefore be suitable for different scenarios, which may have been selected by the developers of the document service packages 114. For example, the first document service package 114 may have been designed with a robust feature set to support highly complex, distributed, and scalable solutions operating on powerful hardware, while the second document service package 114 may have been designed with a simplified feature set to provide a lightweight document service that is easy to learn and deployable on a wide variety of commodity devices. In designing the architecture of each document service package 114 for the selected scenario, the developers may therefore make certain tradeoffs in the supported set of service features. As one example, the "PACELC" taxonomy identifies one well-known set of architectural design choices, wherein a distributed storage system may either be partitioned (resulting in design tradeoffs between availability and consistency), or unpartitioned (resulting in design tradeoffs between latency and consistency). Such choices are often selected by the designers of the document service packages 114 to suit the scenarios in which the document service package 114 is envisioned to be used. Accordingly, while some properties of a document service package 114 may present a set of options (e.g., a document service package 114 may support a limited set of options for a few service features, such as a document service package 114 that is capable of supporting either of two index models 116 at the designation of the administrator 104), such options are typically small, and constrained by the architectural design choices of the developers of the document service package 114.

In view of these architectural design choices, an administrator 104 of one or more servers 102 to be allocated as a document service may encounter difficulties in choosing among the document service packages 114. As a first example, the administrator 104 may simply not know the project criteria 108 of the project 106 with sufficient certainty to commit to a document service package 114; e.g., the details of the project 106 may still be fluid at the time of choosing a document service package 114 on which solutions are to be implemented. As a second example, it may be appreciated that in many scenarios, including the exemplary scenario 100 of FIG. 1, the decision-making process of selecting a document service package 114 that is suitable for the project criteria 108 of the project 106 occurs in the mind of the administrator 104. Accordingly, even if the project criteria 108 are comparatively fixed, the decision among the document service packages 114 may be arduous for the administrator 104, involving extensive research among a potentially large set of options. Moreover, in some scenarios, the administrator 104 may find that none of the available document service packages 114 are fully appropriate for a particular project 106; e.g., several document service packages 114 may present service features satisfying some of the project criteria 108 of the project 106, but none may exist within the research domain of the administrator 104 that satisfy all of the project criteria 108. The administrator 104 may therefore have to alter the project criteria 108 of the project 106 to fit the service features of a selected document service package 114. As a third example, limitations on the available research time of the administrator 104 and familiarity with the available service features may lead to an incorrect selection of a first document service package 114 that is less attuned to the project criteria 108 than another available document service package 114. As a fourth example, some of the service features of a document service package 114 may function differently than anticipated by the administrator 104 (e.g., due to a misunderstanding of the technology, a miscommunication about available features, inaccurate advertising of the capabilities of the document service package 114, or unanticipated bugs or incompatibilities with the computing environment of the server 102). As a fifth example, the project criteria 108 may change after the selection of a document service package 114, resulting in either an inadequate document service or a costly and complicated transition to a different document service package 114 having service features satisfying the updated project criteria 108.

Some other options may be available to the administrator 104 in selecting and administrating the document service package 114 for a project 106. As a first example, the administrator 104 may select, or even requisition, a specialized variant of a document service package 114 that is more closely adapted to the project criteria 108 of the project 106. As a second example, the administrator 104 may seek a specialized configuration that adapts a document service package 114 to the project criteria 108 of the project 106 (e.g., using non-standard configuration settings, or finding or creating add-on modules). However, in addition to involving extensive development resources, these solutions are often short-lived; e.g., variants of a document service package 114 are occasionally ephemeral and minimally maintained, and specialized configuration settings may break when other portions of the document service package 114 are updated. Additionally, administrative resources invested in developing specialized configurations of a document service package 114 may be extensive and speculative, and may yield unreliable solutions. These and other limitations may arise within administrative scenarios involving the selection and configuration of a document service package 114 to provide a document service for a particular project 106.

B. Presented Techniques

In view of these details, the techniques presented herein present an alternative architecture for a document service that may enable a wide range of adaptability for a variety of circumstances. In accordance with these techniques, rather than providing a document service by first selecting among a set of document service packages 114 that are respectively architected for (and largely constrained to) a particular set of scenarios, a document service may be devised as a componentized platform comprising a set of service features, where each service feature may be satisfied by any of several candidate components for the service feature. Each candidate component may, while providing the service feature in the context of a document service, exhibit one or more service characteristics. Moreover, the adaptation of the document service may be achieved through an automated process, in view of a service level agreement that describes a set of expected service criteria of the document service. For example, the administrator 104 of the server 102 may formulate a service level agreement with a customer of the document service (e.g., a project manager within the same organization, or a client of the service of the administrator 104) describing the minimum performance characteristics and the feature set to be supported by the provided document service. Rather than the administrator 104 selecting a document service package 114 that may satisfy various portions of the service level agreement with varying degrees of adequacy, a server 102 may compare the service criteria of the service level agreement with the service characteristics of each available candidate component for each service feature, and automatically select a component satisfying the service criteria. By performing this selection for each service feature of the document service, an embodiment of the techniques presented herein may therefore compose an entire document service that satisfies all of the service criteria of the service level agreement.

Figure 2:
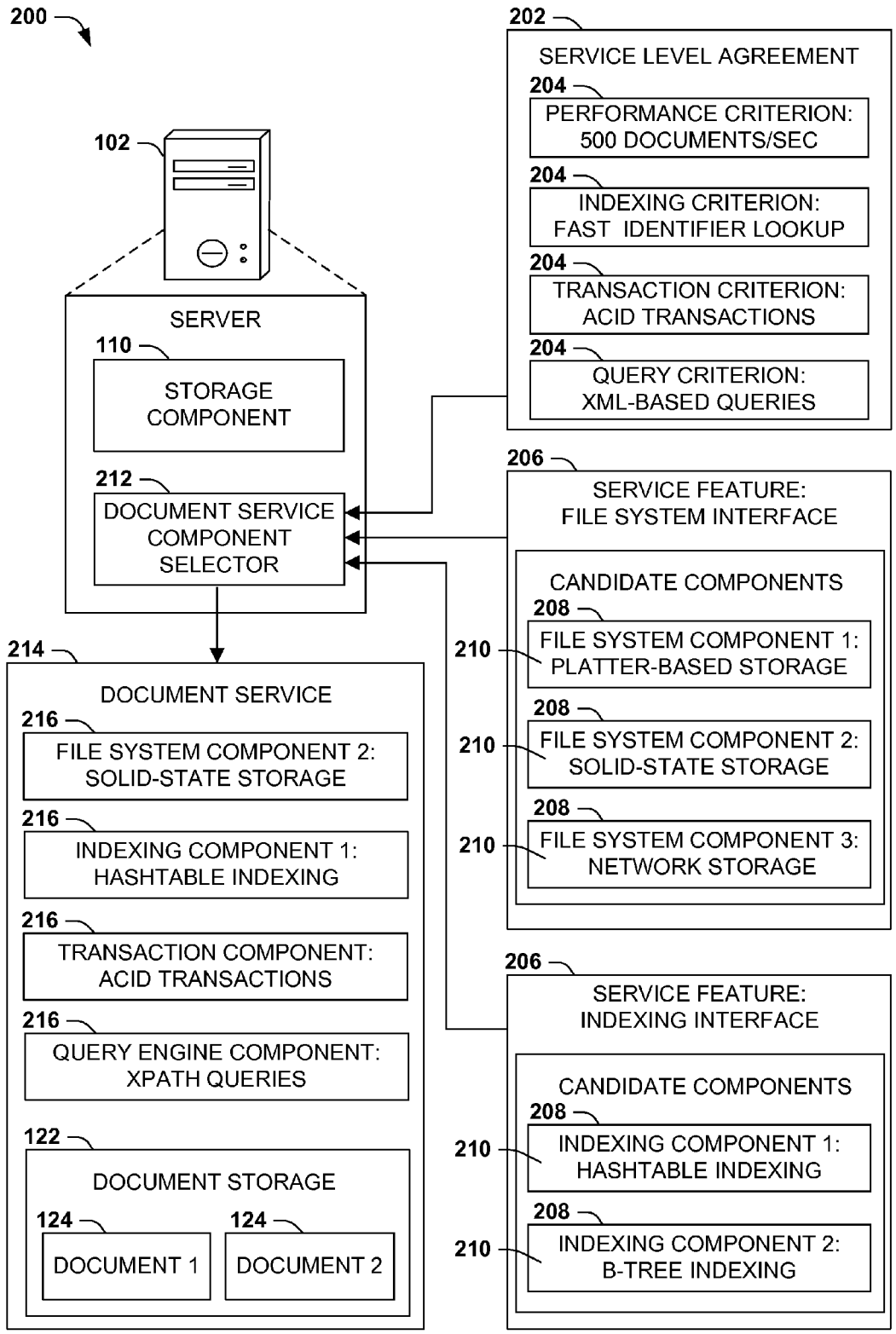
FIG. 2 is an illustration of an exemplary scenario featuring an automated composition of a document service achieved by selecting a service component from a set of candidate components for each service feature of the document service, where the selected service component features service characteristics that satisfy the service criteria of a service level agreement, in accordance with the techniques presented herein.

FIG. 2 presents an illustration of an exemplary scenario 200 featuring an automated composition of a document service 214 by selecting a service component 216 from a set of candidate components 208 for each service feature 206 of the document service 214. In this exemplary scenario 200, a server 102 comprises a set of computing resources, such as a storage component 110. Additionally, a service level agreement 202 may have been provided to describe the document service 214 to be provided by the server 102. The service level agreement 202 specifies a set of service criteria 204 that describe the target properties of the document service 214, such as a minimally acceptable service for a particular project 106. For example, the service level agreement 202 may specify a performance criterion, such as the capability of fulfilling a sustained throughput up to five hundred document accesses per second; an indexing criterion, such as an index that enables fast lookup by document identifier; a transaction criterion, such as the capability of applying ACID transactions to the documents of the document service 214; and a query criterion, such as the capability of processing XML-based queries against the document service 214. These properties of the document service 214 may have been specified by a client or customer of the administrator 104 of the server 102 (e.g., either through negotiation with the administrator 104 or a service order specifying a selection among a set of achievable service criteria 204).

As further illustrated in the exemplary scenario 200 of FIG. 2, the server 102 may comprise a set of candidate components 208 that, when selected to provide a service feature 206 in the document service 214, exhibit one or more service characteristics 210. For example, a storage interface for the document service 214 may be provided by selecting among a first candidate component 208 adapted for platter-based storage devices, and exhibiting such service characteristics 210 as high transfer rates but significant latency caused by the rotational seek across the platter; a second candidate component 208 adapted for solid-state storage devices, and exhibiting such service characteristics 210 as high transfer rates and negligible latency, but which are expensive and often limited capacity; a third candidate component 208 adapted for network storage devices, and exhibiting such service characteristics 210 as built-in replication and mirroring, such as redundant array of inexpensive disk (RAID) storage controllers, but also comparatively low throughput over the network; and a fourth candidate component 208 adapted for sequential-access storage devices, such as magnetic tape, and exhibiting such service characteristics 210 as high capacities at low cost, but also presenting prohibitively high latency for non-sequential access.

In view of the resources depicted in the exemplary scenario 200 of FIG. 2, the document service 214 may be composed through a selection of a service component 208 for each service feature 206 of the document service 214. Moreover, the selection may be performed by a document service component selector 212 that is configured to compare the service criteria 204 specified by the service level agreement 202 and the service characteristics 210 achievable by the candidate components 208 for the service feature 206. For example, for the file system interface, the document service component selector 212 may compare the performance criterion specified by the service level agreement 202 (e.g., the minimum capability of accessing five hundred documents per second), the type of storage component 110 provided by the server 102, and the service characteristics 210 exhibited by the respective candidate components 208 for the file system interface. The document service component selector 212 may identify that the file system component configured for solid-state storage is likely to satisfy the performance criterion specified by the service level agreement 202, and may therefore select the second candidate component 208 in the set of candidate components for the file system service feature 206. Similar selections of service components 216 may be made by the document service component selector 212 for other service features 206. The resulting document service 214 is a composite or aggregated assembly of the selected service components 216, where the service components 216 together satisfy the service criteria 204 of the service level agreement 202.

The techniques illustrated in the exemplary scenario 200 of FIG. 2 provide several advantages with respect to other such techniques. As a first example, the architecture of the document service 214 as a composition of a set of service components 216, each selected to provide a service feature 206, may enable a large, and potentially vast, number of combinations that may be well-suited for a correspondingly large, and potentially vast, set of projects 106 and scenarios. For example, rather than providing a document service package 114 incorporating an architecture selected by the designers to satisfy a particular set of scenarios, a composable document service 214 may be capable of providing an acceptable combination of service components 216 for any project 106 or scenario. As a second example, the automated comparison of the service criteria 204 specified by a service level agreement 202 and the service characteristics 210 of respective candidate components 208 in order to select a service component 216 for each service feature 206 may enable a highly adapted selection of the components 216 with reduced input from the administrator 104, thereby conserving the time and administrative resources of the administrator 104. Indeed, the administrator 104 may not even be familiar with the service features 206, the entire set of available candidate components 208 for a service feature 206, or the significance of the service criteria 204 and the service characteristics 210 exhibited by the service components 216. As a third example, the automated comparison may later be reevaluated (e.g., by monitoring the actual service characteristics 210 exhibited by the selected service components 216 during operation of the document service 214, or upon detecting an update of the service level agreement 202), and an alternative selection for a service feature 214 may result in an automated selection and substitution of a second candidate component 208 capable of providing service characteristics 210 more closely matching the service criteria 204 of the service level agreement 202 than a currently selected service component 216. As a fourth example, the component architecture is more readily amenable to extension (e.g., through the provision of new candidate components 208) than fixed architectures featuring more limited options, the development or commissioning of specialized variants of a document service package 114, and/or administrative configuration. These and other advantages may be achievable through the composition of the document service 214 through the selection of candidate components 208 for respective service features 216 of the document service 214, and in view of the service criteria 204 specified by the service level agreement 202, in accordance with the techniques presented herein.

C. Exemplary Embodiments

Figure 3:
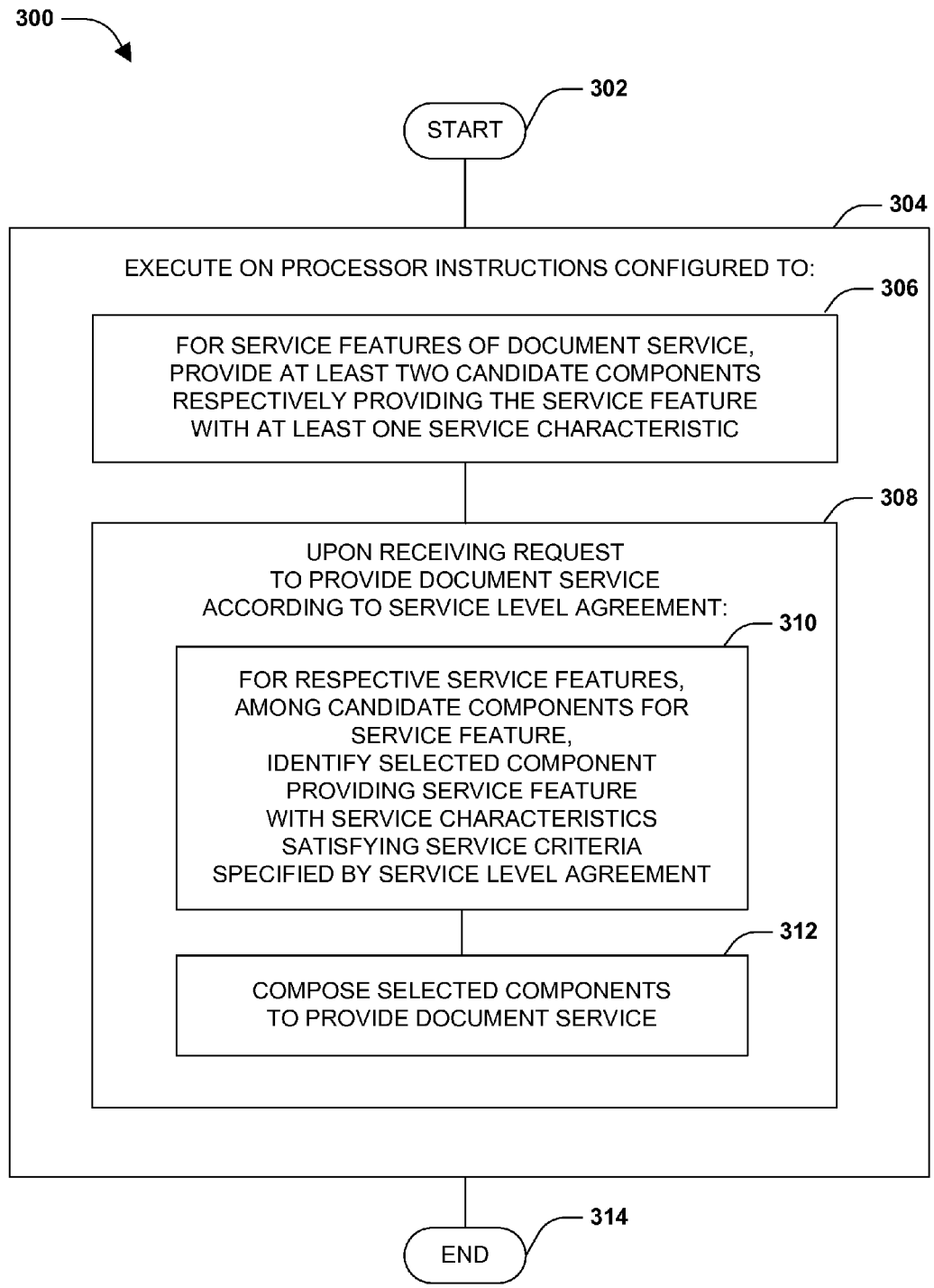
FIG. 3 is an illustration of an exemplary method of composing a document service on a device in satisfaction of a service level agreement in accordance with the techniques presented herein.

FIG. 3 presents a first exemplary embodiment of the techniques presented herein, illustrated as an exemplary method 300 of providing a document service 214 in view of a service level agreement 202. The exemplary method 300 may be performed by a server 102, and may be implemented, e.g., as a set of instructions stored in a memory component of the server 102, such as a memory circuit, a platter of a hard disk drive, a solid-state storage device, or a magnetic or optical disc, and organized such that, when executed the device, cause the server 102 to operate according to the techniques presented herein. The exemplary method 300 begins at 302 and involves executing 304 the instructions on a processor of the server 102. Specifically, the instructions may be configured to, for respective service features 206 of the document service 214, provide 306 at least two candidate components 208 respectively providing the service feature 206 with at least one service characteristic 210. The instructions are also configured to, upon receiving 308 a request to provide the document service 214 according to a service level agreement 202 specifying, for respective service features 206, at least one service criterion 204, identifying 310, for respective service features 3206, among the candidate components 208 for the service feature 206, a selected service component 216 providing the service feature 206 with service characteristics 210 satisfying the at least one service criterion 204 specified by the service level agreement 202 for the service feature 206. The instructions are also configured to compose 312 the selected service components 216 to provide the document service 214. Having achieved the composition of the document service 214 through the selection of service components 216 having service characteristics 210 that satisfy the service criteria 204 of the service level agreement 202, the exemplary method 300 utilizes the techniques presented herein to provide the document service 214 on the server 102, and so ends at 314.

Figure 4:
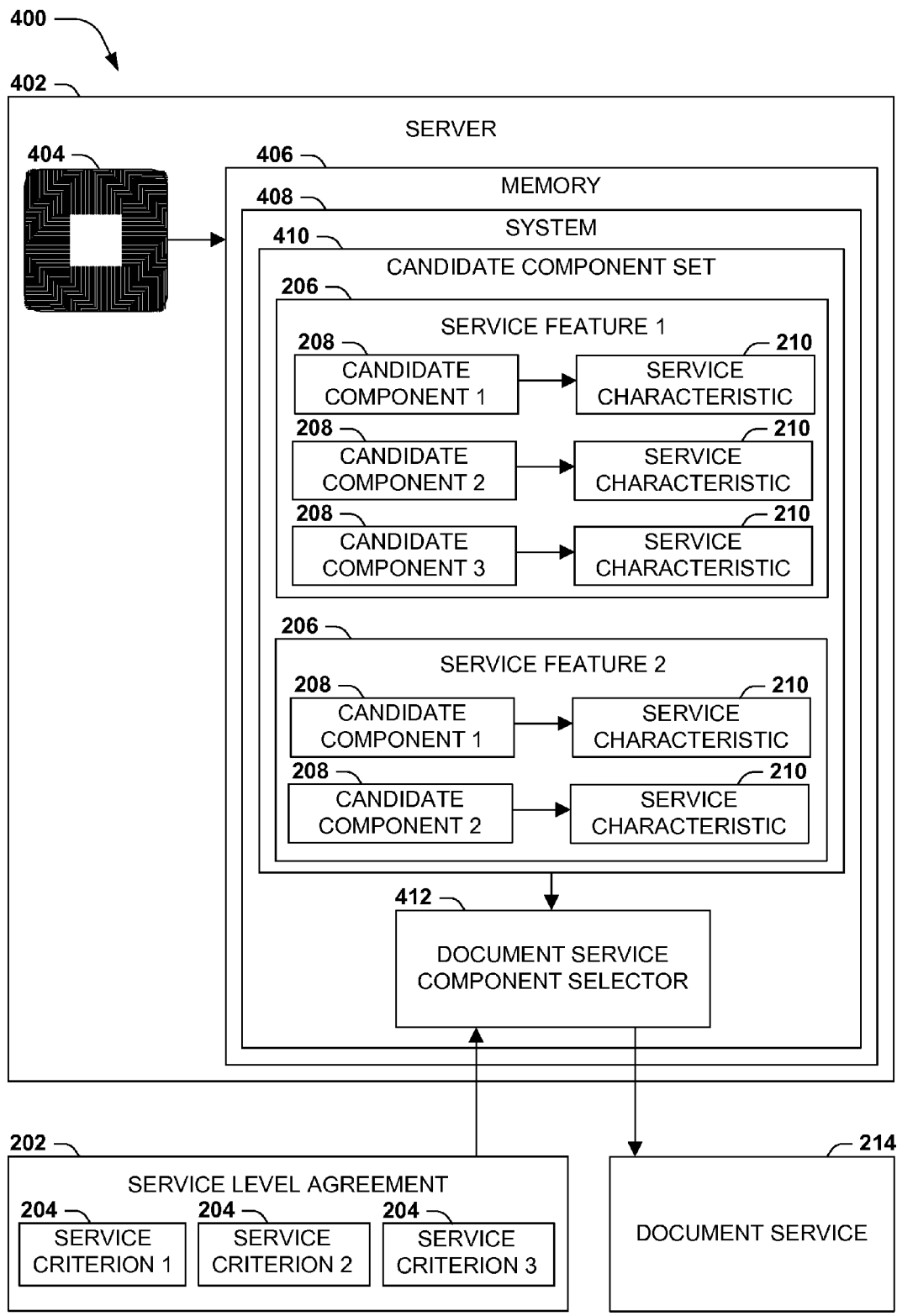
FIG. 4 is a component block diagram illustrating an exemplary system for composing a document service on a device in satisfaction of a service level agreement in accordance with the techniques presented herein.

FIG. 4 presents a second exemplary embodiment of the techniques presented herein, illustrated as an exemplary scenario 400 featuring an exemplary system 408 configured to provide a document service 214 in fulfillment of a service level agreement 202 specifying a set of service criteria 204. The exemplary system 408 may be implemented, e.g., as instructions stored in a memory component 406 of a server 402 having a processor 404, where the instructions comprising the components of the exemplary system 408 are configured to, when executed on the processor 404, cause the server 402 to operate according to the techniques presented herein. The exemplary system 408 comprises a candidate component set 410, comprising, for respective service features 206 of the document service 214, at least two candidate components 208 respectively providing the service feature 206 with at least one service characteristic 210. For example, the service features 206 may include a file system interface enabling access to the documents of the document service 214 according to a file system schema; an indexing interface configured to index the documents of the document service 214 according to a document indexing technique; a transaction interface configured to apply transaction requests to at least one document of the document service 214 according to a transaction model; a replication interface configured to replicate the document service 214 over at least two servers 402 according to a replication model; a query interface configured to apply queries to the document service 214 according to a query model; a scripting interface configured to execute scripts in a script language against the document service 214 according to a scripting environment; and a security interface configured to apply a security model to the document service 214.

The exemplary system 408 illustrated in the exemplary scenario 400 of FIG. 4 also comprises a document service component selector 412, comprising instructions stored in the memory component 406 that, when executed on the processor 404, compose the document service 214 in response to a request including a service level agreement 202 specifying, for respective service features 206, at least one service criterion 204. The document service component selector 412 may achieve this composition by, for respective service features 206, among the candidate components 208 for the service feature 206, identifying a selected service component 216 providing the service feature 206 with service characteristics 210 satisfying the service criteria 204 specified by the service level agreement 202 for the service feature 206. In this manner, the components of the exemplary system 408 of FIG. 4 achieve the composition of a document service 214 fulfilling a service level agreement 202 in accordance with the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
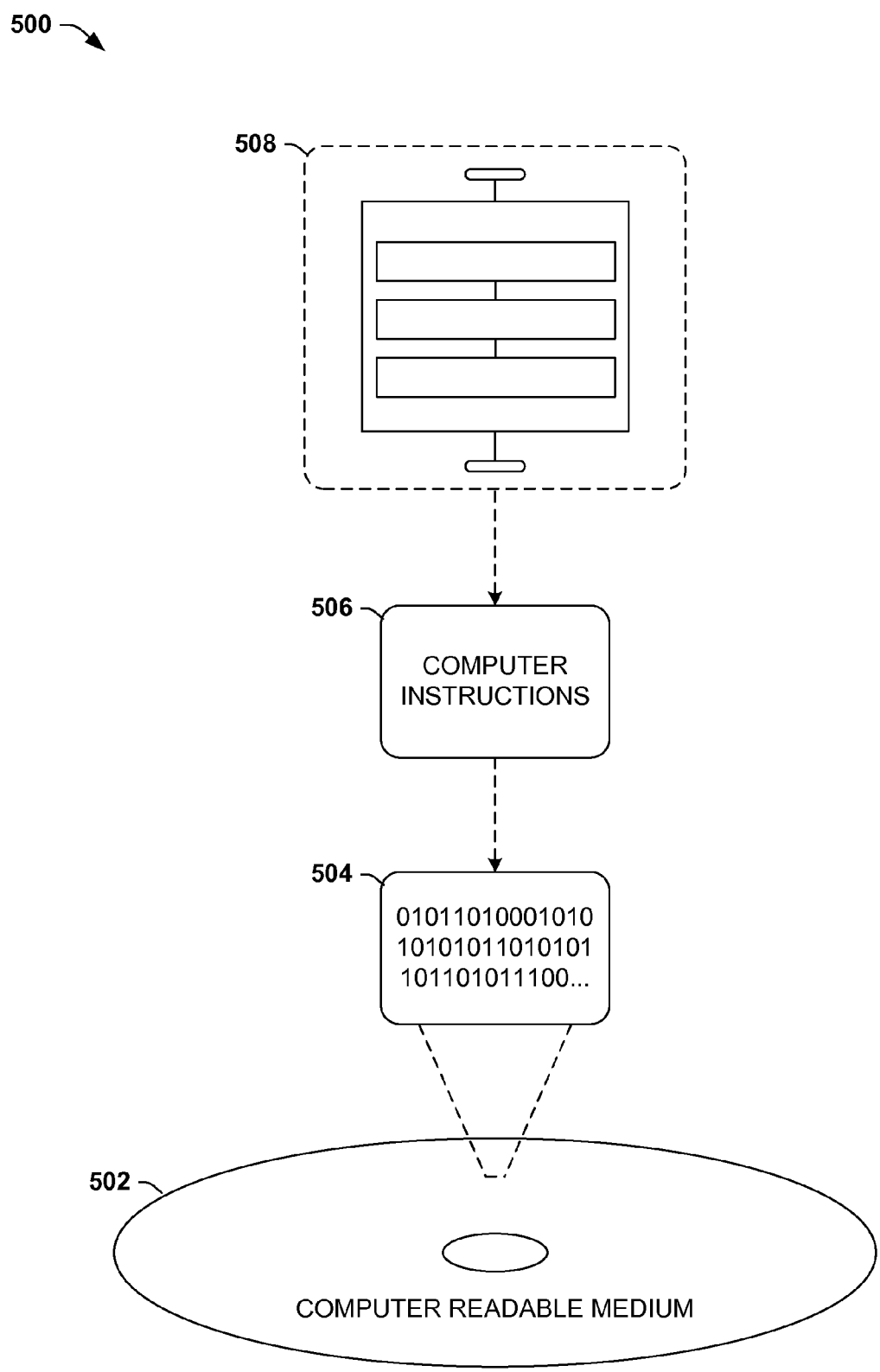
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a method 508 of interacting with a document service 110 in a current context 412 on behalf of an application 104, such as the exemplary method 300 of FIG. 3. In another such embodiment, the processor-executable instructions 506 may be configured to implement a system configured to interact with a document service 110 in a current context 412 on behalf of an application 104, such as the exemplary system 408 of FIG. 4. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3 and the exemplary system 408 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of servers 102, such as server farms or clusters, workstations, laptops, tablets, mobile phones, game consoles, and network appliances. Such servers 102 may also include a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the server 102 may provide many types of document services 214 storing many types of documents 124. As a first such example, the documents 124 may represent objects in an object-oriented environment that respectively comprise a set of member fields; tuples comprising sets of related values; and records of a table in a database. Such documents 124 may present various types and degrees of structure, including completely unstructured data sets; low-level structures, such as key/value stores; and highly defined structures according to a class definition or a schema. As one example, the documents 124 may be formatted according to the JavaScript Object Notation (JSON) application format. As a second such example, the document service 214 may be structured in various ways, such as a file store comprising a set of human-readable or human-unreadable files, or a database server comprising a set of database tables representing the documents 124 and a set of database records. As one example, the document service 214 may comprise a JSON document store, configured to store, access, and index documents 124 structured in the JSON application format. These and other variations may be suitable for implementations of the techniques presented herein.

D2. Service Features

A second aspect that may vary among embodiments of these techniques relates to the types of service features 206 for which the service level agreement 202 specifies service criteria 204, and for which candidate components 208 are provided.

As a first variation of this second aspect, the service features 206 may include a file system interface, which may be positioned between the document service 214 and provided to store files in a file system representing the documents 124 and other resources of the document service 412. For the file system interface, a service level agreement 202 may specify service criteria 204 such as the capacity of the file system interface (e.g., at least ten terabytes of available storage); achievable throughput of the file system interface (e.g., the capability of accessing five hundred documents per second); an average latency (e.g., the capability of fulfilling a request for a document 124 within 100 milliseconds); a fault rate for the storage of documents 124 (e.g., a maximum bit error rate (BER) of $10^{-8}$); a fault tolerance of the file system (e.g., a Redundant Array of Inexpensive Disks (RAID) level to be achieved by the file system); and an on-disk encryption mechanism (e.g., the application of a level of the Advanced Encryption Standard (AES) for files stored on disk).

Correspondingly, the server 102 may comprise a set of at least two file system components that are respectively capable of storing files in a file system comprising the documents 124 of the document service 412. However, respective file system components may be provided that perform this task in different circumstances. As a first example, different file system components may be provided for different file system schema (e.g., a File Allocation Table (FAT or FAT32) file system interface, a New Technology File System (NTFS) file interface, and a Hierarchical File System (HFS) file system interface). As a second example, different file system components may be provided for different types of storage devices (e.g., different file system interfaces specialized for various file system storage device type selected from a file system storage device set comprising a platter-based storage device, such as a hard disk drive; a solid-state storage device, such as a flash drive; a network storage device, such as a network file server; and a sequential-access storage device, such as magnetic tape). As a third example, different file system components may be provided for different types of access patterns for accessing the documents 124 (e.g., a high-concurrency access pattern, a transaction-oriented access pattern, and a performance-oriented access pattern; or a first access pattern comprising a small set of very large documents 124, and a second access pattern comprising a very large set of small documents 124; or a first access pattern specialized for sequential access, such as for streamed documents 124, and a second access pattern specialized for random access). As a fourth example, different file system components may organize the storage of documents 124 in the storage component 110 according to different organizations and file structures (e.g., a collection of files respectively representing a single document 124; a large database file comprising all of the documents 124 of the document service 412; a block map, wherein respective files represent a fixed-size, arbitrarily partitioned chunk of the data comprising the documents 124 of the document service 412; or a storage of documents 124 on disk as a hashtable, a B-Tree, or another data structure).

Moreover, respective file system components may present different sets of service characteristics 210 when selected for use in the document service 412, such as capacity, throughput, latency, bit error rates, fault tolerance, and encryption. The document service component selector 412 may evaluate the service characteristics 210 of respective candidate components 208 when selected for inclusion in the document service 214 (e.g., the compatibility and suitability of each candidate component 208 with the types and properties of the storage components 110 of the server 102), and may select the candidate component 208 for the file system interface presenting service characteristics 210 that satisfy the service criteria 204 for the service feature 206. In view of such properties, the document service component selector 212 may perform a selection for the file system service feature 206 by determining which among the candidate components 208 for the file system interface present file system performance characteristics that satisfy the file system service criteria 204 specified by the service level agreement 202.

Notably, this selection may result in the selection of a candidate component 206 that is not specialized for the particular storage device 110 of the server 102, or that is less specialized for the storage device 110 than a second candidate component, but that is capable of providing a more satisfactory set of service characteristics 210. For example, a currently available set of "hybrid" storage devices comprise traditional platter-based storage (e.g., a hard disk drive) coupled with a smaller amount of solid-state storage providing a data cache. Depending on various properties of the document service 412 and a "hybrid" storage component 110, the document service component selector 212 may select either a platter-based file system component (e.g., if the document service 412 is more dependent on high capacity than low latency) or a solid-state file system component (e.g., if the document service 412 is more dependent on low latency than high capacity). This variance may also enable the selection of candidate components 208 for new device types for which no specialized candidate component 208 exists; for new access patterns, such as peculiar access patterns involved in specialized projects; and for an unintuitive selection of candidate components 208, such as a selection of a magnetic tape file system component for a platter-based hard disk drive for a project 108 that is heavily reliant on sequential access, such as streaming.

As a second variation of this second aspect, the service features 206 of the document service 412 may include an indexing interface, provided by at least two indexing components respectively configured to index the documents 124 of the document service 412 according to a document indexing technique exhibiting at least one indexing characteristic. For example, the indexing characteristics may comprise a lookup rate (e.g., the ability to identify and retrieve a document 124 within ten milliseconds); a lookup type (e.g., the capability to index and retrieve documents 124 according to a variety of fields of different data types, such as unique or non-unique integers, floating-point numbers, strings, dates, and binary objects); and a lookup mechanism (e.g., the capability of locating a document through a partial match of a specified field; of specifying index criteria according to a Boolean combination of parameters; or of locating documents within an identifier range). The indexing characteristics may also include various performance characteristics of the index, such as an average seek time, a worst-case seek time in view of collisions among document identifiers, and scalability to maintain performance characteristics upon receiving a growing volume of documents 124). Correspondingly, respective indexing components may provide the indexing service feature 206 for the document service 214 in a different manner (e.g., according to various indexing techniques), that exhibit different indexing service characteristics 210.

For example, the indexing candidate components 208 for the indexing service feature 206 may include a first indexing service component 216 utilizing a hash-based indexing technique, which permits very fast lookups (typically O(1)) of exact matches with specified identifiers but that has difficulty satisfying indexing lookups with partial matches, and also may present a tradeoff between sparse indexing data for small sets of documents 124, degraded performance for saturation by large sets of documents 124 that consume the capacity of the hashtable, and maintenance penalties if the hashtable is recalculated for a large document set. The indexing candidate components 208 for the indexing service feature 206 may also include a second indexing service component 216 utilizing a B-Tree indexing technique, which provides high scalability for very large document sets and the capability of easily locating documents 124 indexed within an identifier range, but which provides slower average access (e.g., O(log n) performance) that may be prohibitive for very large document sets that are to be accessed quickly. The indexing candidate components 208 for the indexing service feature 206 may also include a third indexing service component utilizing a Bloom filter indexing technique, which may provide very fast (e.g., O(1) performance), efficient, and scalable lookup for set-type indexing, but which may present the tradeoffs of imperfect accuracy and maintenance difficulties (e.g., the difficulty in removing a document 124 from a set). According to these service characteristics 210, the document service component selector 212 may select among the available indexing components by comparing the indexing characteristics exhibited by the document indexing techniques of the indexing candidate components 208 and the indexing criteria specified by the service level agreement 202.

As a third example of this second aspect, the service features 206 provided by the document service 412 may include a replication interface, which provides replication of the document service 412 over a set of servers 102 according to various replication models. The details included in various replication models may include, e.g., various types of clusters of servers 102 among a server set within a server location; various numbers and types of replicas stored by the collected set of servers 124 (e.g., storing two primary replicas of the entire document set, and two differential replicas for recent updates); different synchronization and conflict resolution mechanisms; and various roles into which the servers 102 are partitioned to provide the document service 412. In this manner a set of candidate components 208 for the replication service feature 206 may each replicate the document service over at least two servers 102 according to different replication models that exhibit different replication characteristics. Correspondingly, the service level agreement 202 may specify a set of replication criteria (e.g., a replica count, such as a minimum number of replicas maintained for the document service 412; a replica distribution level, such as a minimum geographic distribution of the replicas; a replica consistency level, such as the frequency with which various replicas synchronize; and a replica conflict resolution policy to resolve conflicting versions of the same document 124 provided by different replicas). The selected service component 212 may select a service component 216 from among the candidate components 272 for the replication service feature 206 by comparing the replication characteristics achievable by the replication models utilized by each candidate component 208 replication service criteria 204 specified by the service level agreement 202.

As a fourth variation of this second aspect, the service features 206 provided by the document service 214 may include a transaction interface, which enables various types of transactions to be applied to the documents 124 of the document set 214. As a first example, respective transaction components may enable transactions according to different types of transaction models, such as a first transaction model enabling atomic, consistent, isolated, and durable transactions (an ACID transaction model), and a second transaction model enabling "basically" available, soft state, and "eventually" consistent transactions (a BASE transaction model). The transactions enabled by various transaction models may also involve, e.g., the capabilities of distributed transactions; various types of journaling that enable various degrees of commit and rollback; and compatibility with various checkpoint archiving techniques. Accordingly, respective candidate components 208 for the transaction service feature 206 may support different transaction models by working differently with the resources of the server 102 (such as the storage component 110 and a selected replication component), and may exhibit different sets of transaction characteristics. Correspondingly, the service level agreement 202 may specify a set of transaction service criteria 204 (e.g., the types of transactions to be used in a particular project 108), and the document service component selector 212 may select a service component 216 from among the candidate transaction components by determining which candidate components 208 exhibit transaction characteristics that satisfy the transaction criteria specified by the service level agreement 202.

As a fifth variation of this second aspect, the service features 206 provided by the document service 214 may include a query interface, which may be configured to apply queries to the document service 214 according to a query model. For example, various query models may include different query languages (e.g., variants of the Structured Query Language (SQL) or the XPath query language); query engine features, such as concurrency, state persistence, long-running queries, continuous queries, and parallelizability over a subset of the servers 102 comprising the document service 214; and query processing capabilities, such as scalability to handle at least five hundred queries per second. Accordingly, respective candidate components 208 for the query service feature 206 may support different query models and may exhibit different sets of query characteristics. Correspondingly, the service level agreement 202 may specify a set of query service criteria 204 (e.g., the set of query languages, query features, and query throughput capabilities) to be provided by the document service 214, and the document service component selector 212 may select a service component 216 from among the candidate query engine components by determining which candidate components 208 exhibit query characteristics that satisfy the query criteria specified by the service level agreement 202.

As a sixth variation of this second aspect, the service features 206 provided by the document service 214 may include a scripting interface, which may be configured to apply scripts to the document service 214 according to a scripting environment. For example, various scripting environments may include different script languages (e.g., JavaScript, and also Python and compiled or uncompiled Java); the accessibility of various sets of libraries, frameworks, and runtimes within such scripting environments (e.g., the Node.js JavaScript server-side scripting library); the threading model of the scripts (e.g., a threading concurrency, interprocess communication interfaces, parallel processing capabilities, and persistence of long-running scripts); the circumstances under which each script is invoked (e.g., a stored procedure or trigger model); the performance of the scripting environment (e.g., time slices, allocations per second, and resource allocation for a virtual environment of the script). Accordingly, respective candidate components 208 for the scripting service feature 206 may support different scripting environments, and may exhibit different sets of scripting characteristics. Correspondingly, the service level agreement 202 may specify a set of scripting service criteria 204 (e.g., the set of script languages, scripting environment features, and scripting engine performance criteria) to be provided by the document service 214, and the document service component selector 212 may select a service component 216 from among the candidate scripting engine components by determining which candidate components 208 exhibit scripting characteristics that satisfy the scripting criteria specified by the service level agreement 202.

As a seventh variation of this second aspect, the service features 206 provided by the document service 214 may include a security interface, which may be configured to apply various security models to the processes and resources comprising the document service 214. For example, various security models may include different types of permissions (e.g., rules, heuristics, and access control lists (ACLs)); different types of isolation contexts for isolating various processes executing within the document service 214; different types of authentication models (e.g., a user login/password authentication model with a particular password policy; a two-factor authentication model; and a certification-based authentication model); encryption to be applied to communications with the document service 214 (e.g., policies for choosing and utilizing asymmetric encryption keys); and different types of security monitoring to be utilized within the document service 214 (e.g., firewalls, process and resource monitors, and event logging services). Accordingly, respective candidate components 208 for the security service feature 206 may support different security models, and may exhibit different sets of security characteristics. Correspondingly, the service level agreement 202 may specify a set of security criteria 204 (e.g., password policies, encryption levels, and security monitoring) to be provided by the document service 214, and the document service component selector 212 may select a service component 216 from among the candidate security components by determining which candidate components 208 exhibit security characteristics that satisfy the security criteria specified by the service level agreement 202.

These and other examples of the service features 206 provided by the document service 214, and the selection of service components 216 having service characteristics 210 satisfying the service criteria 204 of a service level agreement 202, may therefore enable the composition of the document service 102 to satisfy the details of a wide range of projects 106 and scenarios.

Figure 6:
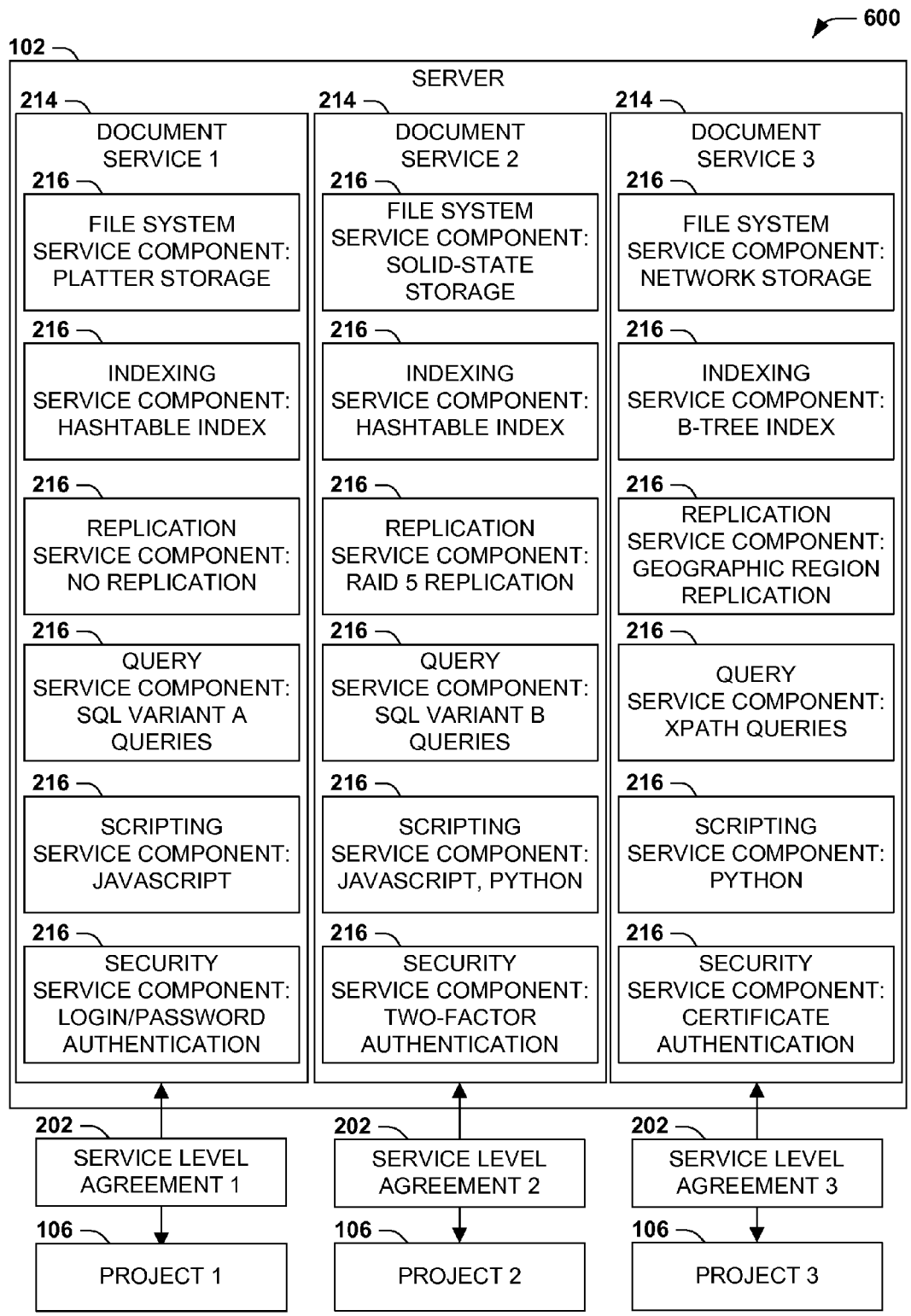
FIG. 6 is an illustration of an exemplary scenario featuring a variety of document services, respectively comprising a selection of service components exhibiting service characteristics that satisfy the service criteria of a different service level agreement, in accordance with the techniques presented herein.

FIG. 6 presents an illustration of an exemplary scenario 600 featuring the composition of document services 214 in light of various service level agreements 202 indicating the constraints for various projects 106. In this exemplary scenario 600, a server 102 may provide the document service 214 as a composition of a variety of service components 216 for various service features 206 of the document service 214, and may invoke a document service component selector 412 to perform the selection among a set of candidate components 208 for each service feature 206 in view of the service characteristics 210 demonstrated thereby, and the service criteria 204 of the service level agreement 202. For example, a first document service 214 may comprise a platter-based storage technique; a hashtable indexing technique; omitted replication; support for a first variant of the Structured Query Language, and the JavaScript scripting environment; and a security model involving login/password user authentication. A second document service 214 may comprise a solid-state storage technique; a hashtable indexing technique; replication equivalent to Redundant Array of Inexpensive Disks (RAID) level 5; support for a second variant of the Structured Query Language, and scripting environments for both JavaScript and Python; and a security model applying two-factor user authentication. A third document service 214 may comprise a network storage technique; B-Tree-based indexing; geographically distributed replication (such as clusters of servers 102 provided in different geographic locations); support for XPath querying; and Python scripting; and a security model utilizing certificate-based authentication. In this manner, the server 102 may provide a variety of document services 214, each adapted to the details of a particular project 106. Those of ordinary skill in the art may devise many such types of service features 206, and many such ways of composing document services 214 through the selection of service components 216 in view of a service level agreement 202, in accordance with the techniques presented herein.

D3. Service Component Selection

A third aspect that may vary among embodiments of these techniques involves the manner of selecting service components 216 in view of the service criteria 204 specified by the service level agreement 202 and the service characteristics 210 of the candidate components 208.

A first variation of this third aspect relates to the manner of determining the service characteristics 210 of respective candidate components 208. As a first such example, the document service component selector 212 may receive service characteristics 210 specified by or for each candidate component 208 (e.g., by reading a manifest of each candidate component 208 indicating its typical service characteristics 210). As a second such example, the document service component selector 212 may detect the service characteristics 210 of the candidate components 208 when selected for the document service 214 and utilized in the computing environment of the server 102. For example, for respective candidate components 206 providing a service feature 206, the document service component selector 212 may provisionally select the candidate component 202 for the service feature 206; measure at least one exhibited service characteristic 210 of the document service 214 while utilizing the provisionally selected candidate component 202; and select the service component 216 for the document service 214 as the candidate component 208 having exhibited service characteristics 210 that satisfy the query criteria 204 of the service level agreement 202.

As a second variation of this third aspect, the document service component selector 212 may also consider other information while selecting a service component 216 for a particular service feature 206, such as the resources of the server 102 (e.g., the type of storage components 110 accessible to the server 102); the role of the server 102 in the document service 214; and the selection of other service components 216 for other service features 208 (e.g., after identifying a first selected service component 216 for a first service feature 206, the document service component selector 212 may select a second service component 216 for a second service feature 206 in view of the selection of the first service component 216 for the first service feature 206). For example, a particular transaction model may feature higher compatibility or performance when used with a first storage technique than with a second storage technique, and therefore may preferentially select a first candidate component 208 for the storage service feature 206 utilizing the first storage technique over a second candidate component 208 for the storage service feature 206 utilizing the second storage technique.

As a third variation of this third aspect, the document service component selector 212 may occasionally face scenarios where two or more candidate components 210 satisfy the service criteria 204 of the service level 202, and may be configured to contend with this scenario in various ways. As a first example, the document service component selector 212 may simply select the candidate component 208 having the highest degree of match between the service characteristics 210 of the candidate component 208 and the service criteria 204 of the service level agreement 202. As a second example, the document service component selector 212 may apply additional selection criteria specified by an administrator 104 for selecting among the qualifying candidate components 208, such as selecting the candidate component 208 having a highest efficiency of satisfying the service criteria 204 (e.g., the candidate component 208 utilizing the fewest resources of the server 102 to satisfy the service criteria 204). As a third example, the document service component selector 212 may notify an administrator 104 of the server 102 regarding the plurality of qualifying candidate components 208, and may receive from the administrator 104 a selection of a selected candidate component 208 to be used for the service feature 206. Alternatively, if the document service component selector 212 determines that none of the candidate components 208 are sufficient to satisfy the service criteria 204 of the service level agreement 202, the document service component selector 212 may notify an administrator 104 of the failure (and may indicate a suggestion for an adjusted set of service criteria 204 that a combination of service components 216 may be capable of satisfying).

As a fourth variation of this third aspect, after selecting the service components 216 for the service features 206 and composing the document service 214, the document service component selector 212 may monitor the performance of the document service 214 to ensure continued satisfaction of the service level agreement 202. For example, after identifying a selected service component 216 for a service feature 206, the document service component selector 212 may (e.g., periodically or continuously) measure the exhibited service characteristics 210 of the selected service component 216 while utilized in the document service 214 for the service feature 206. The document service component selector 212 may therefore detect if exhibited service characteristics 210 fail to satisfy the service criteria 204 specified by the service level agreement 202 (e.g., because the typical or projected service characteristics 210 of the candidate component 208 differ from the exhibited service characteristics 210 during utilization in the document service 214, or because changes in the computing environment of the server 102 alter the performance of the service component 216). In such scenarios, the document service component selector 212 may notify an administrator 104 of the server 102 regarding the failure. Alternatively or additionally, the document service component selector 212 may attempt to find a substitute service component 216 for the service feature 206 (e.g., by reevaluating the candidate components 208 for the service feature 206, and upon identifying a second candidate component 208 exhibiting service characteristics 210 satisfying the service criteria 204 of the service level agreement 202 for the service feature 206, substitute the second candidate component 208 for the selected service component 216 in the document service 214).

As a fifth variation of this third aspect, the document service component selector 212 may enable and adapt to updates to the service level agreement 202. For example, upon receiving an updated service level agreement 202 while using a current service level agreement 202, the document service component selector 212 may identify at least one updated service feature 206 for which the updated service level agreement 202 specifies at least one updated service characteristic 204 of the updated service feature 206, as compared with the corresponding service criterion 204 of the current service level agreement 202. For respective updated service features 206, the document service component selector 212 may reevaluate the candidate components 208 for the updated service feature 206; and upon identifying a second candidate component 208 exhibiting service characteristics 210 that satisfy the service criteria 204 specified by the updated service level agreement 202 for the updated service feature 206, the document service component selector 212 may substitute the second candidate component 208 for the selected service component 216 in the document service 214. In this manner, the document service component selector 212 may enable an automated adaptation to updates in the service level agreement 202 by recomposing the document service 214 with a different set of service components 216. Those of ordinary skill in the art may devise many such techniques for configuring a document service component selector 212 to select the service components 216 composing the document service 214 in accordance with the techniques presented herein.

E. Computing Environment

Figure 7:
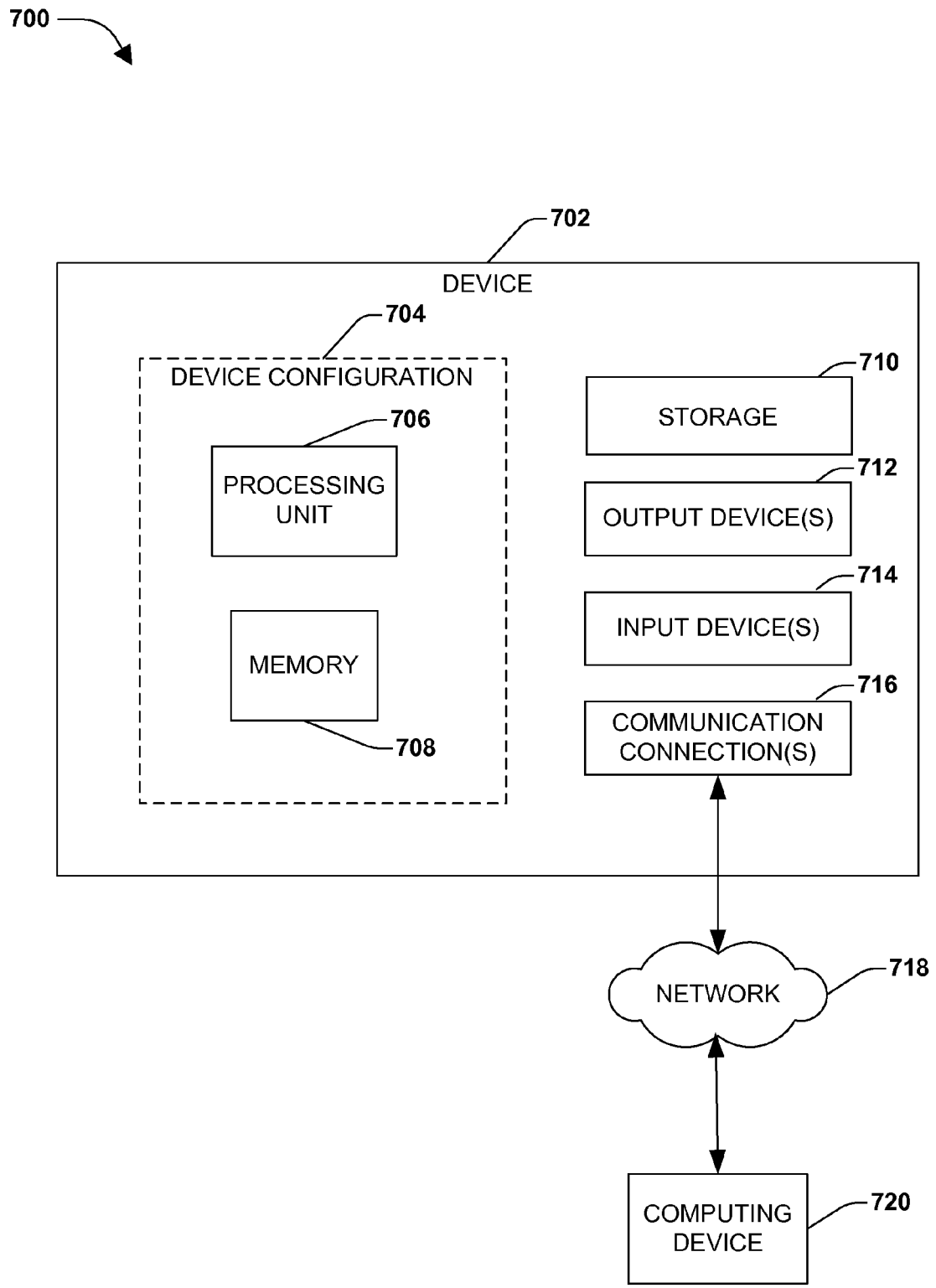
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 702 configured to implement one or more embodiments provided herein. In one configuration, computing device 702 includes at least one processing unit 706 and memory 708. Depending on the exact configuration and type of computing device, memory 708 may be volatile (such as RAM, for example), non-volatile (such as ROM, flash memory, etc., for example) or some combination of the two. This configuration is illustrated in FIG. 7 by dashed line 704.

In other embodiments, device 702 may include additional features and/or functionality. For example, device 702 may also include additional storage (e.g., removable and/or non-removable) including, but not limited to, magnetic storage, optical storage, and the like. Such additional storage is illustrated in FIG. 7 by storage 710. In one embodiment, computer readable instructions to implement one or more embodiments provided herein may be in storage 710. Storage 710 may also store other computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, but is not limited to, a modem, a Network Interface Card (NIC), an integrated network interface, a radio frequency transmitter/receiver, an infrared port, a USB connection, or other interfaces for connecting computing device 702 to other computing devices. Communication connection(s) 716 may include a wired connection or a wireless connection. Communication connection(s) 716 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of computing device 702 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access computing device 720 and download a part or all of the computer readable instructions for execution. Alternatively, computing device 702 may download pieces of the computer readable instructions, as needed, or some instructions may be executed at computing device 702 and some at computing device 720.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of providing a document service according to a service level agreement, the method involving a device comprising a hardware processor, and the method comprising:

executing, by the processor, instructions that cause the device to;
for each different and distinct respective service feature of at least two service features of the document service, provide at least two candidate components wherein each candidate component comprises a different set of service feature capabilities than other candidate components; and
fulfill a request to provide the document service according to the service level agreement by selecting a particular service component for each respective service feature of the at least two service features of the document service, wherein the selecting the particular service component comprising:
identifying a capability for the service feature that is specified by the service level agreement for the document service, and
among the candidate components for the service feature, identifying a service component that provides the service feature with the capability that is specified by the service level agreement for the service feature; and
composing the selected particular service components for the respective at least two service features to provide the document service.

2. The method of claim 1, wherein:
the at least two service features of the document service including a file system interface provided by at least two file system components respectively configured to access documents of the document service according to a file system schema exhibiting at least one file system performance characteristic; and
the selecting the particular service component for the file system interface comprising:
selecting a file system component configured to access the documents of the document service according to the file system schema exhibiting the at least one the system performance characteristics satisfying at least one file system criterion specified by the service level agreement.

3. The method of claim 1, wherein:
the at least two service features of the document service including an indexing interface provided by at least two indexing components respectively configured to index documents of the document service according to a document indexing technique exhibiting at least one indexing characteristic; and
the selecting the particular service component for the indexing interface comprising:
selecting a indexing component implementing a document indexing technique configured to index the documents of the document service according to the document indexing technique exhibiting the at least one indexing characteristics satisfying at least one indexing criterion specified by the service level agreement.

4. The method of claim 3, wherein the at least two respective indexing components being selected from an indexing component set comprising:
a hash indexing component utilizing a hash-based indexing technique;
a B-Tree indexing component utilizing a B-Tree indexing technique; and
a Bloom filter component utilizing a Bloom filter indexing technique.

5. The method of claim 1, wherein:
the at least two service features of the document service including a replication interface provided by at least two replication components respectively configured to replicate the document service over at least two servers according to a replication model exhibiting at least one replication characteristic; and
the selecting the particular service component for the replication interface comprising:
selecting a replication component configured to replicate the document service over the at least two servers according to the replication model exhibiting the at least one replication characteristics satisfying at least one replication criterion specified by the service level agreement.

6. The method of claim 5, wherein the at least one replication characteristics being selected from a replication characteristic set comprising:
a replica count;
a replica distribution level;
a replica consistency level; and
a replica conflict resolution policy.

7. The method of claim 1, wherein:
the at least two service features of the document service including a transaction interface provided by at least two transaction components respectively configured to apply transaction requests to at least one document of the document service according to a transaction model exhibiting at least one transaction characteristic; and
the selecting the particular service component for the transaction interface comprising:
selecting a transaction component configured to apply the transaction requests to the documents of the document service according to the transaction model exhibiting the at least one transaction characteristics satisfying at least one transaction criterion specified by the service level agreement.

8. The method of claim 7, wherein the at least two respective transaction components being selected from a transaction model set comprising:
an ACID (Atomicity, Consistency, Isolation, Durability) transaction model; and
a BASE (Basic Availability, Soft-state, Eventual Consistency) transaction model.

9. The method of claim 1, wherein:
the at least two service features of the document service including a query interface provided by at least two query engine components respectively configured to apply queries to the document service according to a query model exhibiting at least one query model characteristic; and
the selecting the particular service component for the query interface comprising:
selecting a query engine component configured to apply queries to the document service according to the query model exhibiting the at least one query model characteristic satisfying at least one query criterion specified by the service level agreement.

10. The method of claim 1, wherein:
the at least two service features of the document service including a scripting interface provided by at least two scripting environment components respectively configured to execute scripts in a script language against the document service according to a scripting environment exhibiting at least one scripting characteristic; and
the selecting the particular service component for the scripting interface comprising:

selecting a scripting environment component configured to execute scripts in the script language against the document service according to the scripting environment exhibiting the at least one scripting characteristics satisfying at least one scripting criterion specified by the service level agreement.

11. The method of claim 1, wherein:
the at least two service features of the document service including a security interface provided by at least two security components respectively configured to apply to the document service a security model exhibiting at least one security characteristic; and
the selecting the particular service component for the security interface comprising:
selecting a security component configured to apply to the document service the security model exhibiting the at least one security characteristics satisfying at least one security criterion specified by the service level agreement.

12. The method of claim 1, the identifying the particular service component for the respective at least two service features comprising:
for the respective at least two candidate components providing the service feature:
provisionally select a candidate component for the service feature;
measure at least one exhibited service characteristic of the document service while utilizing the selected candidate component; and
identify the particular service component as the candidate component having exhibited the at least one service characteristics satisfying the at least one service criterion specified by the service level agreement for the service feature.

13. The method of claim 1, wherein the identifying the particular service component providing a first service feature comprising:
after identifying a second particular service component for a second service feature, identify the particular service components among candidate components for the first service feature in view of the second particular service component for the second service feature.

14. The method of claim 1, wherein the instructions further configured to, upon identifying; for the service feature, the at least two candidate service components respectively satisfying at least one service criterion specified by the service level agreement for the service feature:
notify an administrator of the server of the at least two candidate components; and
upon receiving from the administrator a selection of a respective candidate service component, identify the respective candidate service component as the particular service component for the service feature.

15. The method of claim 1, wherein the instructions further configured to, after identifying the particular service component for the service feature:
measure at least one exhibited service characteristic of the particular service component while utilizing the particular service component in the document service for the service feature; and
upon measuring the at least one exhibited service characteristic that fails to satisfy at least one service criterion specified by the service level agreement, notify an administrator of the document service of the at least one exhibited service characteristics of the particular service component.

16. The method of claim 1, wherein the instructions further configured to, after identifying the particular service component among the at least two candidate components for the service feature:
measure at least one exhibited service characteristic of the particular service component while utilizing the particular service component in the document service for the service feature; and
upon measuring the at least one exhibited service characteristic that fails to satisfy at least one service criterion specified by the service level agreement:
reevaluate the at least two candidate components for the service feature; and
upon identifying a second candidate component exhibiting the at least one service characteristics satisfying the at least one service criterion specified by the service level agreement for the service feature, substitute the second candidate component for the particular service component in the document service.

17. The method of claim 1, wherein the instructions further configured to, upon receiving an updated service level agreement while using a current service level agreement:
identify at least one updated service feature for which the updated service level agreement specifies at least one updated service criterion of the updated service feature as compared with the at least one service criterion of a current service level agreement; and
for respective updated service features:
reevaluate respective candidate components for the updated service feature; and
upon identifying a second candidate component exhibiting service characteristics satisfying the at least one updated service criterion specified by the updated service level agreement for the updated service feature, substitute the second candidate component for the particular service component in the document service.

18. The method of claim 1, wherein:
a respective service feature of the at least two service features comprises an indexing of documents of a document set; and
respective candidate components for the indexing feature further comprise:
a first indexing candidate component that indexes the documents according to a hash index;
a second indexing candidate component that indexes the documents according to a B-Tree index; and
a third indexing candidate component that indexes the documents according to a Bloom filter index.

19. A server that provides a document service on a device, the server comprising:
a hardware processor; and
a hardware memory storing instructions that, when executed by the hardware processor, provide a system comprising:
a service feature component set that, for respective service features of at least two service features of the document service:
provides at least two candidate components for each respective service feature, wherein each candidate component comprises a different set of service feature capabilities than other candidate components; and
a document service composer that fulfills a request to provide the document service according to a service level agreement by selecting a particular service component for each different and distinct respective service feature of the at least two service features of the document service, wherein the selecting the particular service component comprising:
  identifying a capability for the service feature that is specified by the service level agreement for the document service, and
  among the candidate components for the service feature, identifying a service component that provides the service feature with the capability that is specified by the service level agreement for the service feature; and
  composing the selected particular service components for the respective at least two service features to provide the document service.

20. A method of providing a document service according to a service level agreement, the method comprising:
  executing, by a hardware processor, instructions that cause a device to:
    for each different and distinct respective service feature of at least two service features of the document service:
      identifies a service feature capability for the respective service feature that is specified by the service level agreement for the document service;
      provides at least two candidate service components, wherein each component comprises a different set of service feature capabilities than the other candidate components;
      evaluates the at least two candidate service components to identify a particular service component that provides the respective service feature with the service feature capability specified by the service level agreement; and
    fulfill a request to provide the document service by;
      interconnecting the particular service components for the respective at least two service features; and
      providing the document service as a composition of the selected particular components.

* * * * *